Sept. 11, 1945.    W. A. MELSOM    2,384,635
FLEXIBLE HOSE COUPLING
Filed Dec. 16, 1943
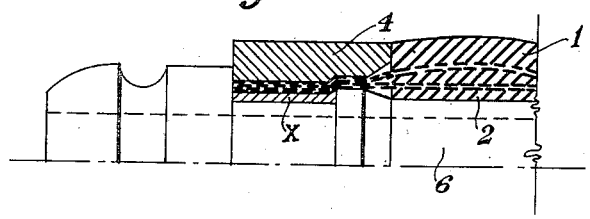
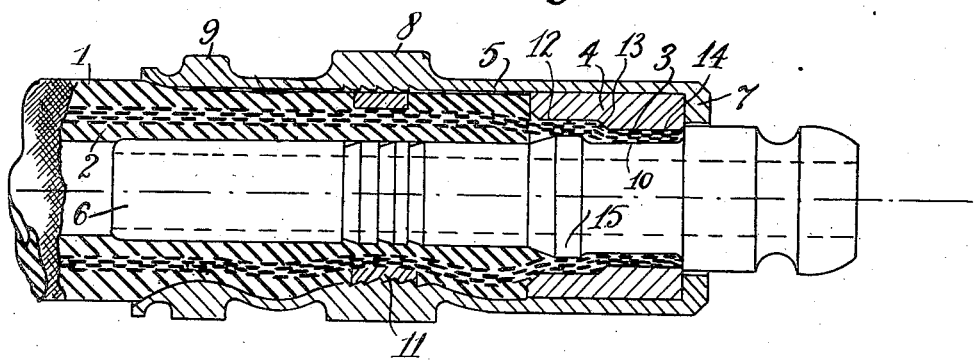
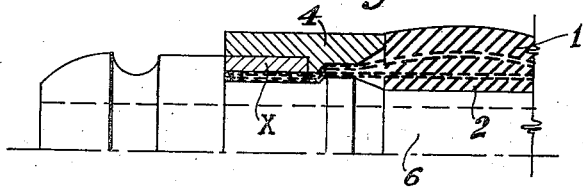
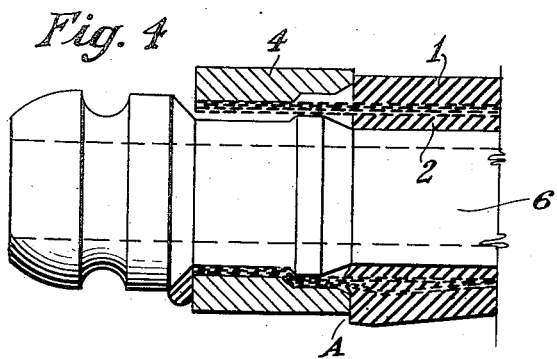
INVENTOR
Walter Arthur Melsom
BY Albert F. Nathan
ATTORNEY

UNITED STATES PATENT OFFICE 2,384,635

FLEXIBLE HOSE COUPLING

Walter Arthur Melsom, Wembley Hill, England, assignor to Bowden (Engineers) Limited, London, England, a British company Application December 16, 1943, Serial No. 514,529
In Great Britain April 3, 1942

6 Claims. (Cl. 285—84)

The present invention relates to improvements in flexible hose coupling components comprising a flexible hose having tubular layers of resilient material such as rubber in various forms, natural or synthetic, reinforced by one or more tubular layers of flexible metallic and/or textile reinforcing material embedded between such layers of resilient material, an inner rigid tubular insert and a circumferentially continuous sleeve which is made of a material suited to contraction such as brass, aluminium alloy, low carbon steel, or phosphor bronze and is contracted to clamp the hose on to the insert (which may be of the same material as the sleeve) and which components are suitable, and more particularly intended, for use with medium and high pressure hoses (i. e., hoses suitable for pressures of from 500 lbs. per sq. inch upwards) such as are employed for the hydraulic or pneumatic transmission of power or for the conveyance of gases, liquids, semi-solids or viscous substances under pressure, where it is of great importance that the coupling shall neither blow off nor the anchoring stresses prove too severe for the hose material.

The invention relates to improvements in or modifications of the subject matter claimed in the parent specification No. 438,464 dated April 10, 1942 and according to the principal modification a circumferentially continuous metallic ring or tube member (hereinafter referred to as a ring) separate from the sleeve is contracted on to an end portion of the reinforcement, which has been previously bared within and without, so as to clamp it firmly onto the insert, and the sleeve is then slidden into a position where it surrounds the ring and also an unbared portion of the hose and is contracted on to such unbared portion so as to seal it fluid-tightly on to the insert, the sleeve and ring being so formed and arranged as to prevent any substantial escape between them of the rubber displaced by such last mentioned contraction suitable space being left within the sleeve to accommodate such displaced material or the bulk thereof.

The sleeve is preferably formed with an inwardly projecting end wall which is brought up to the end of the ring remote from the unbared portion of the hose, such end wall acting as locating means for enabling the sleeve to be quickly and accurately positioned with regard to the ring and providing a neat finish to the coupling. The sleeve and ring should fit sufficiently closely substantially to prevent any escape of rubber.

Where the hose comprises two or more layers of reinforcing material, embedded in the hose with an intervening layer or layers of rubber or like material, I prefer as in the main patent to cut away one or more of such reinforcing layers and the intervening rubber so that the separate ring member and the insert directly grip the opposite sides of the same reinforcing layer, but in a variant form applicable where there is only a thin intervening rubber layer I may bare the outer face of the outer layer and the inner face of the inner layer so that the said separate ring member grips the outer layer and the insert the inner layer, the thin intervening layer of rubber being forced into the interstices of the reinforcement or squeezed out to the side during the swaging of such member.

Since according to this invention the ring is contracted before the sleeve is placed in position round it, the position of such ring in relation to the unbared portion of the hose can be accurately fixed, which enables the space to be left within the sleeve to accommodate displaced rubber to be calculated with greater accuracy. In practice I have found it advantageous to bring the ring into the closest practicable contact with the unbared portion of the hose.

While the bared part is preferably directly gripped between the separate member and the insert, other members (which need not necessarily be of metal but may be compressed fibre, strong closely woven canvas, or other material which will contract sufficiently but will not flow readily like the rubber or rubber like material of the hose) may be interposed between the bared portion on the one hand and the separate ring member and/or insert on the other.

The reinforcement of the hose may be forced into a peripheral groove in, or over a peripheral rib on, the insert.

According to another feature of this invention, the interior (hereinafter termed the bore) of the ring which receives the bared reinforcement before this is clamped has an enlarged mouth which is so shaped as to close in the bared reinforcement radially, if necessary for the reasons hereinafter described, when this is inserted through the mouth or the mouth is passed over it. The reduced hollow neck or boss of the sleeve described and shown in the parent specification may be formed in this way, or the separate ring described herein may be so formed, e. g., the separate ring may have a larger portion of its bore which first receives the end of the bared reinforcement and a sloping shoulder leading to a smaller portion of its bore.

I would have it understood that it is an essential feature of my invention that the pressure used in contracting the sleeve and the ring is such as to produce a permanent deformation thereof and when in this specification I speak of "contracting" the sleeve or ring I mean so contracting them as to permanently deform them.

The invention is illustrated by way of example in the accompanying drawing, which is diagrammatic and not to scale. Figure 1 of the drawing represents a hose coupling and shows, in the upper part, the ring contracted and the sleeve assembled ready for contraction and, in the lower part, the sleeve contracted. Fig. 2 is a partial sectional view illustrating the use of a supplemental clamping member between the insert and the braiding. Fig. 3 is a view similar to Fig. 2 but illustrating the supplemental member between the braiding and the ring, both figures illustrating the relation of the parts before having the sleeve assembled thereon. Fig. 4 is a detail figure more clearly illustrating the displacement of the rubber or rubber like material from between layers of braiding, the upper half illustrating the relation of parts before contraction of the separate ring, and the lower part, the relation after contraction of the ring.

In carrying out the invention, in the form shown in Figs. 1 and 4 of the drawing, I strip off an end part of the outer covering 1 and remove an end part of the inner covering 2 of the hose by known or approved means so as to leave an end part 3 of the metal braiding bare. The bared end portion 3 of the metal braiding is passed through the ring 4 until the shoulder of the hose formed by baring the braiding abuts the end of the ring. The ring is then closed down, e. g., by radially closing devices, upon the bared braiding which is thereby powerfully clamped between the ring member and the rigid insert 6. Figs. 2 and 3 illustrate the invention applied to a coupling wherein an additional member X, not necessarily of metal, but which may be compressed fibre, strong closely woven canvas, or other material which will contract sufficiently but will not flow readily like the rubber or rubber like material of the hose, is interposed between the bared portion of the braiding and the insert 6 and/or the separate ring member 4. In Fig. 4, the step marked A is shown greatly exaggerated; it is not in fact sufficient to prevent sliding the sleeve over the contracted ring onto the hose to the assembled condition illustrated in Fig. 1.

The sleeve 5 is now slidden over the contracted ring until the end wall 7 of the sleeve abuts the corresponding end of the ring (see the upper half of the drawing). Thereafter the medial enlarged band 8 of the sleeve 5 is closed down around the rubber covered end portion of the hose so as to grip such portion between the sleeve and the insert with a pressure sufficient to seal the hose fluid tightly on the insert. A further enlarged band 9 is preferably provided nearer the end of the insert which projects into the hose and which is also contracted around the covered portion of the hose as described in the main patent. The braiding may be forced down into a groove 10 in the insert or around a rib thereof, and the ring 4 may be locally thickened where it is to be contracted around such a groove. Sufficient space is left within the sleeve to accommodate the displaced rubber, as is described in the main patent, and by previously contracting the separate ring up to the shoulder of the hose and precluding escape of rubber between the ring and the sleeve, the constancy of this space, which should correspond as far as possible to the volume of the displaced material, may be satisfactorily secured uniformly in different couplings.

In some cases the reinforcing layer may be additionally gripped by a ring 11, preferably in the form of a metal band wrapped round a groove cut in the outer tube or tubes of the hose, as described and claimed in our application No. 442,208, filed May 8, 1942.

The bore of the ring member has a larger portion 12, and a sloping shoulder 13 leading to a lesser portion 14, thus forming an enlarged mouth which if necessary, e. g., for the undermentioned reason, closes in the bared braiding radially when this is inserted through the mouth or the mouth is passed over it. This closing in is desirable when the end of the braiding tends to expand radially when the hose to be fitted is cut off from a length as described in the parent specification.

The enlarged bore of the ring or of the neck may encircle an enlarged portion 15 of the insert so as not to leave an undue cavity beyond the end of the covered part of the hose.

What I claim is:

1. A hose coupling component suitable for use with medium or high pressure hose, comprising a flexible hose having tubular layers of rubber or like resilient material reinforced by at least one flexible layer of reinforcing material embedded between the layers of resilient material, a circumferentially continuous metallic sleeve and a rigid insert, wherein a ring separate from the sleeve is contracted on to an end portion of the reinforcement, which has been previously bared within and without, so as to clamp it firmly on to the insert and sliding the sleeve into a position where it surrounds the ring and also an unbared portion of the hose for contraction on to such unbared portion so as to seal it fluid tightly on to the insert, the sleeve and ring being proportioned to prevent any substantial escape between them of the rubber displaced by such last mentioned contraction suitable space being left within the sleeve to accommodate at least the bulk of such displaced material.

2. A hose coupling component as in claim 1, in which the insert is grooved or recessed and the bared reinforcing material is pressed by the construction of the ring into a said groove or recess in the insert.

3. A hose coupling component suitable for use with medium or high pressure hose, comprising a flexible hose having tubular layers of rubber or like resilient material reinforced by a plurality of flexible layers of reinforcing material embedded between adjacent resilient layers, a circumferentially continuous metallic sleeve and clamping members comprising at least a rigid insert and a ring separate from the sleeve, the end portion of the outer one of said reinforcing layers being externally bared of the surrounding resilient material and the end portion of the inner one of said reinforcing layers being internally bared of the resilient material lying under it, said separate ring member being then contracted around the bared portions and the rubber or like material between said portions being thereby pressed out and the said portions powerfully gripped between the clamping members, said sleeve being then slidden into a position where it surrounds the ring and also an unbared portion of the hose and is then contracted on to such unbared portion so as to seal it fluid tightly on to the insert, the sleeve and ring being so formed and arranged as to prevent any substantial escape between them of the rubber displaced by such last mentioned contraction, suitable space being left within the sleeve to accommodate at least the bulk of such displaced material.

4. A hose coupling component suitable for use with medium or high pressure hose, comprising a flexible hose having tubular layers of rubber or like resilient material reinforced by at least one flexible layer of reinforcing material embedded between the layers of resilient material, a circumferentially continuous metallic sleeve, clamping members comprising a rigid insert member and a ring member separate from the sleeve, and at least one additional clamping element, said ring member being contracted around an end portion of the reinforcement which has been previously bared within and without so as to clamp said bared portion firmly between said clamping members with said additional clamping element disposed between the bared reinforcement and at least one of said members the sleeve being thereafter assembled in a position where it surrounds the ring and also an unbared portion of the hose and is contracted onto such unbared portion so as to seal it fluid tightly on to the insert, the sleeve and ring being so closely fitted as to prevent any substantial escape between them of the rubber displaced by such last mentioned contraction, suitable space being left within the sleeve to accommodate at least the bulk of such displaced material.

5. A hose coupling component suitable for use with medium or high pressure hose, comprising a flexible hose having tubular layers of rubber or like resilient material reinforced by at least one flexible layer of reinforcing material embedded between the layers of resilient material, a circumferentially continuous metallic sealing sleeve, a rigid insert and a clamping ring, the bore of said ring having an enlarged mouth, and an end portion of the reinforcement which has been previously bared within and without being arranged in said ring bore, the mouth of which is shaped to contract the bared reinforcement during the relative axial movement between the bared portion and the ring in arranging the bared portion therewithin, the said ring being contracted around said bared portion so as to clamp it firmly between the said ring and the insert, the sealing sleeve being contracted onto the unbared portion of the hose so as to seal it fluid tightly onto the insert.

6. A method of making a hose coupling component for a medium or high pressure hose comprising tubular layers of rubber or like resilient material reinforced by at least one flexible layer of reinforcing material embedded between the layers of resilient material, which consists in baring an end portion of the reinforcement from within and without, arranging an insert in the end of the hose so that it lies within the bared and unbared portions of the hose and arranging a ring around said bared portion and against the shoulder of the unbared portion of the hose, and contracting said ring to grip the said bared portion onto the insert, then sliding a circumferentially continuous metallic sleeve into a position where it surrounds the unbared portion of the hose with a circumferential clearance space and also so closely surrounds the said contracting ring that when the sleeve is medially contracted around the unbared hose portion to seal it fluid tightly onto the insert at least the bulk of the rubber displaced by such contraction is received in said clearance space and substantially prevented from escaping between the sleeve and the ring, and with the sleeve so arranged, effecting the said medial contraction thereof.

WALTER ARTHUR MELSOM.